(12) United States Patent
Suarez et al.

(10) Patent No.: US 6,832,092 B1
(45) Date of Patent: *Dec. 14, 2004

(54) METHOD AND APPARATUS FOR COMMUNICATION WITHIN A VEHICLE DISPATCH SYSTEM

(75) Inventors: Gustavo G. Suarez, Plantation, FL (US); Carlos S. Baradello, Tiburon, CA (US); Len Debarros, Hillsboro Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 744 days.

This patent is subject to a terminal disclaimer.

(21) Appl. No.: 09/686,672

(22) Filed: Oct. 11, 2000

(51) Int. Cl.[7] .................................................. H04Q 7/20
(52) U.S. Cl. .............................. 455/456.1; 455/456.6; 455/517; 707/10
(58) Field of Search .......................... 455/456.1, 456.5, 455/456.6, 517, 456.4; 707/10; 709/203

(56) References Cited

U.S. PATENT DOCUMENTS

| 5,432,841 A | 7/1995 | Rimer ........................ 455/410 |
| 5,678,194 A | 10/1997 | Grube et al. ................. 701/207 |
| 5,835,857 A | 11/1998 | Otten .......................... 455/410 |
| 5,884,221 A | 3/1999 | Wortham ..................... 701/300 |
| 6,212,393 B1 * | 4/2001 | Suarez et al. ............ 455/456.4 |
| 6,239,700 B1 * | 5/2001 | Hoffman et al. ....... 340/539.13 |
| 6,577,874 B1 * | 6/2003 | Dailey ........................ 455/521 |

* cited by examiner

Primary Examiner—Greta Robinson
Assistant Examiner—Cheryl R. Lewis
(74) Attorney, Agent, or Firm—Randi L. Karpinia

(57) ABSTRACT

A method for communication within a vehicle dispatch system (10) wherein a wireless communication device (36) co-located with a vehicle (14) receives a location parameter (50) in an assignment message (32), compares the location parameter (50) to the current location (56) of the vehicle (14) and processes the assignment message (32) when the location parameter (50) corresponds to the current location (56). The wireless communication device (36) includes a receiver (46), a memory (54), an assignment manager (58), and a processor (60).

12 Claims, 12 Drawing Sheets

METHOD AND APPARATUS FOR COMMUNICATION WITHIN A VEHICLE DISPATCH SYSTEM

BACKGROUND OF THE INVENTION

1. Field of the Invention

This invention relates in general to vehicle dispatch systems, and in particular to the communication of assignment messages within vehicle dispatch systems.

2. Description of the Related Art

A number of vehicle dispatch systems exist for the tracking and controlling of fleets such as taxicabs, delivery trucks, and the like. These systems typically communicate requests for dispatch to the vehicles in the fleet and then match acceptance of the request to the particular request. Key criteria of vehicle dispatch systems, whether manual or automatic, simple or complex, include the system cost, the system performance, and the fairness and timeliness of the selection process.

Historically, two-way radio networks have been utilized for vehicle dispatch. Voice communication is the primary communication tool for information gathering and decision making relating to the distribution of assignments in these systems. A dispatch center broadcasts a message of a new assignment location either via a data network or a voice network to the drivers of the various vehicles in the fleet; and each individual driver replies with his/her acceptance or rejection of the assignment to the dispatch center. Typically, the driver's reply is accomplished via a voice network such as a cellular phone or two-way radio.

There are several drawbacks to these vehicle dispatch systems. First, the driver must be alert at all times to listen to the assignment messages from the dispatch center and rapidly determine if the assignment location is within his/her range. The driver must make a quick decision for each message of whether to accept the job or not. In some fleets, if the driver affirmatively replies to the dispatch center and then does not get to the assignment location within a pre-determined amount of time he can be fined. The combination of the rapid assignment messaging and decision-making and the potential for fines creates high stress levels in the drivers of the vehicles.

A second drawback of the traditional vehicle dispatch systems is that some of the drivers will answer any call, even if not close to the assignment location, motivated by a desire to maximize income or challenge the system. This creates an environment wherein the customer suffers from not receiving the most rapid service. Further, drivers from competing fleets can monitor the frequency of message transmission with a scanner and "steal" the assignments from the drivers who the message was targeted to reach.

Further, the broadcast of the assignment message in traditional vehicle dispatch systems is made throughout the entire territory covered by the fleet. In areas where there is a shortage of radio frequency channels, the available channels are rapidly filled to capacity. The expense of maintaining existing channels and/or petitioning the local government for new channels can be out of reach for many dispatch businesses.

Today, vehicle dispatch systems designed to alleviate some of the previously described drawbacks typically focus communications and decision-making at the dispatch center. Information such as geographical location and current job status of a selected vehicle is established; and then decisions regarding sending the current dispatch message to that selected vehicle are made by comparing that information either manually or automatically to some predefined criteria in the dispatch center. Automatic vehicle locator systems that automatically track the location of managed vehicles and then report this information to a dispatcher are frequently utilized. Advanced automatic vehicle locator systems further automatically identify the nearest vehicle to a location to further facilitate the dispatcher's accuracy. In some systems, the geographical location is compared to known locations of authorized vehicles and dispatch of the message is denied to the selected vehicle if the selected vehicle's location does not correspond to one of the known locations.

Other vehicle dispatch systems automatically assign jobs to the closest available vehicle and then inform the driver of the assignment via some other channel, such as the driver's mobile pager. In this method, no assurance is given that the driver receives the notification or is actually available to take the assignment. The driver actually has no method to decline the assignment in this type of system.

The drawback of all of these systems is that the control rests within the dispatch center completely and the complexity of the system communications is increased greatly. Further the channel utilization increases since each call must be sent individually to each selected driver. Lastly, the systems still rely heavily on the dispatcher to make decisions and perform monitoring of the vehicles. This leads to a high degree of errors and confusion.

What is needed is a method to reduce the loading of the channels used for vehicle dispatch, reduce the decision-making stress on the vehicle drivers, and at the same time retain the automatic sorting mechanisms of the dispatch center-based systems.

DETAILED DESCRIPTION OF THE INVENTION

Figure 1:
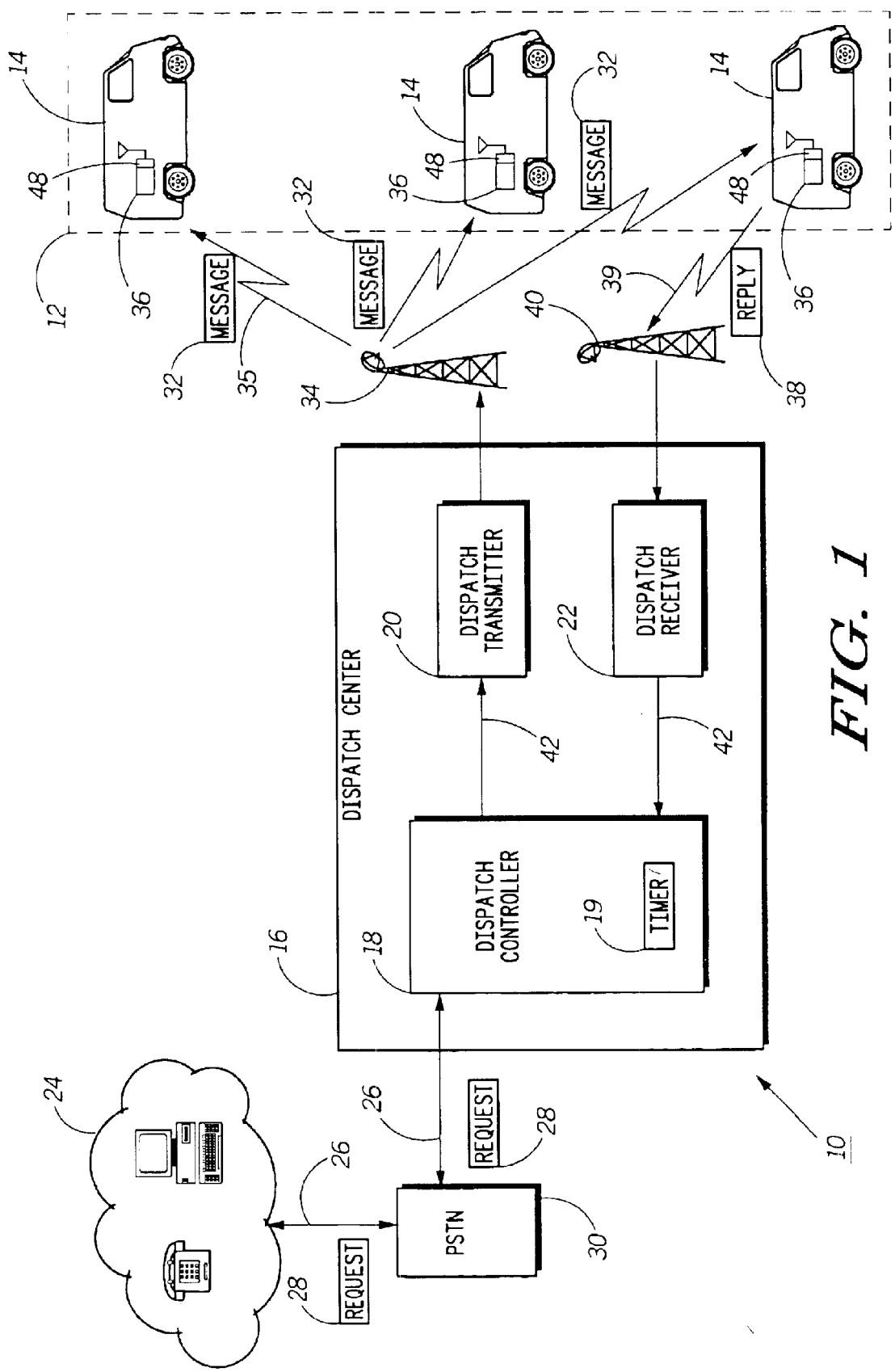
FIG. 1 is a block diagram of a vehicle dispatch system.

Referring to FIG. 1, a vehicle dispatch system 10 for the management of a fleet 12 of vehicles 14 such as taxicabs, delivery trucks and the like is illustrated. The vehicle dispatch system 10 comprises a message input device 24, such as a telephone or computer terminal, connected through a conventional public switched telephone network (PSTN) 30 by a plurality of conventional telephone links 26 to a dispatch center 16. It will be appreciated by one skilled in the art that the message input device 24 may also communicate with the dispatch center 16 via alternative communication means such as radio frequency (RF) channels, satellite links, or Internet.

The dispatch center 16 functions in a wide variety of manners ranging from fully manual systems to automatic systems employing complex tracking methods. The dispatch center 16 includes a dispatch controller 18, a dispatch transmitter 20, and a dispatch receiver 22. The dispatch controller 18 oversees the operation of the dispatch transmitter 20 and the dispatch receiver 22 through one or more communication links 42, which typically are conventional telephone links, and additionally can include RF, microwave, or other high quality audio communication links. The dispatch controller 18 encodes inbound requests for dispatch 28 into outbound assignment messages 32, and decodes inbound replies 38 from the vehicles 14 for matching of a request for dispatch 28 with a vehicle 14 that affirmatively replies. The dispatch controller 18 preferably includes a timer 19 for managing the scheduling of assignments. The dispatch controller 18 schedules the assignment message 32 for transmission by the dispatch transmitter 20, via a transmit antenna 34, to each vehicle 14 of the fleet 12 on at least one outbound radio frequency (RF) channel such as a first communication channel 35. Each vehicle 14 includes a wireless communication device 36 capable of receiving and processing the assignment messages 32.

It will be appreciated that the vehicle dispatch system 10 may function utilizing any wireless RF channel for the first communication channel 35, for example, a one or two way pager channel, a mobile cellular channel, or a mobile radio channel. In the following description, the RF communication channel refers to any of the wireless RF channels listed above or an equivalent. Each wireless communication device 36 assigned for use in the vehicle dispatch system 10 has an address 48 assigned thereto, which is a unique selective call address. The address 48 enables the transmission of the assignment message 32 from the dispatch controller 18 only to the addressed wireless communication device 36. The address 48 also identifies the replies 38 sent by the wireless communication device 36 over at least one outbound radio frequency (RF) channel such as a second communication channel 39; and received at the dispatch controller 18 through the dispatch receiver 22 via a receive antenna 40. A list of the assigned addresses for each of the wireless communication devices 36 is stored in the dispatch controller 18 in the form of a vehicle subscriber database.

Figure 2:
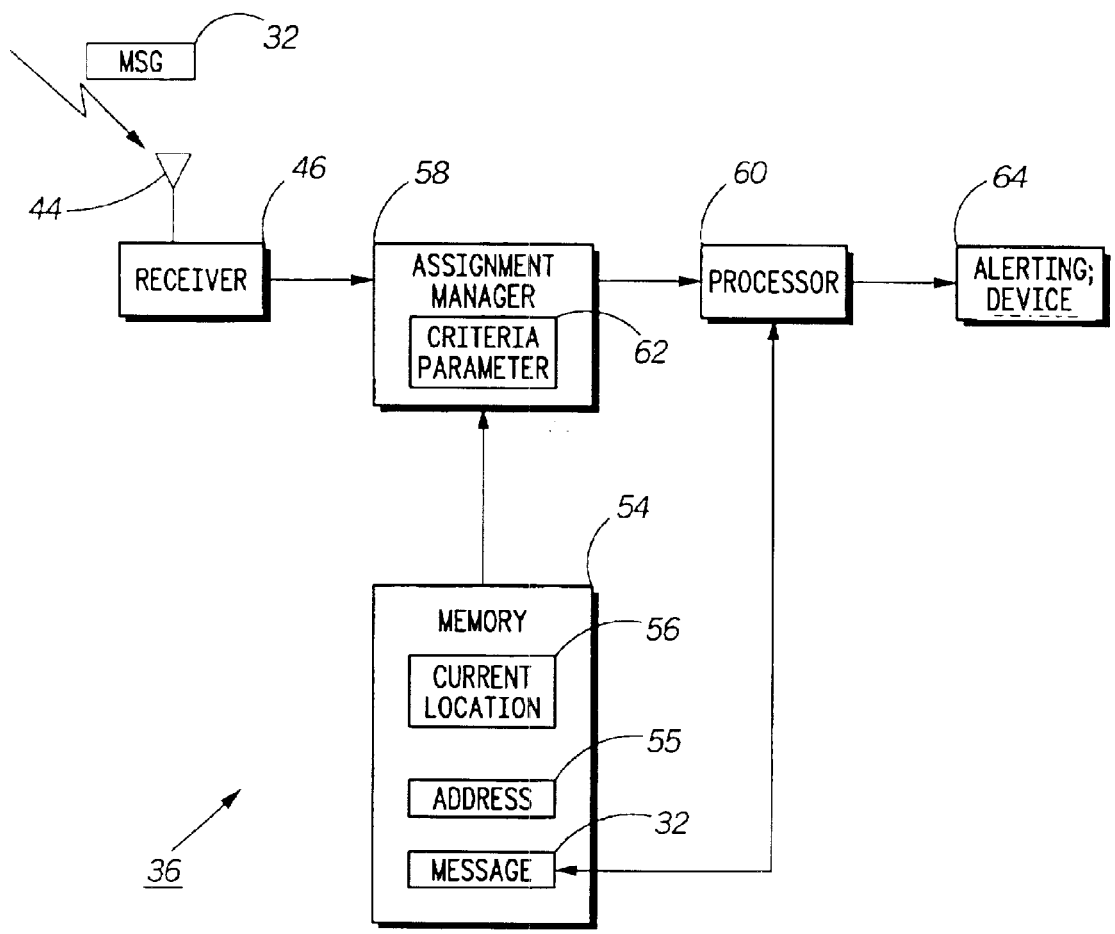
FIG. 2 is an electrical block diagram of a wireless communication device for use within the vehicle dispatch system of FIG. 1.

FIG. 2 is an electrical block diagram of a wireless communication device 36 for use within the vehicle dispatch system 10 of FIG. 1. The wireless communication device 36 includes an antenna 44 for intercepting transmitted signals from the dispatch center 16 of the vehicle dispatch system 10. The antenna 44 is coupled to a receiver 46 employing conventional demodulation techniques for processing the communication signals received from the dispatch center 16 such as the assignment message 32. The receiver 46 is capable of receiving and demodulating voice as well as data signals.

Figure 3:
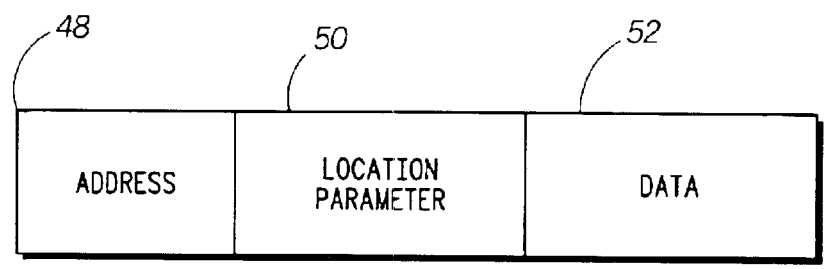
FIG. 3 is an illustration of an assignment message for communication within the vehicle dispatch system of FIG. 1.

FIG. 3 is an illustration of the assignment message 32 for communication with the wireless communication device 36 of FIG. 2. The assignment message 32 preferably includes an address 48, a location parameter 50, and a data 52. The address 48 identifies the wireless communication device 36 for which the assignment message 32 is directed. The location parameter 50 identifies the geographical location of the assignment being transmitted in the data 52 of the assignment message 32. The data 52 includes all details of the assignment such as customer name, number of passengers, the required time of pick-up, etc.

Referring back to FIG. 2, coupled to the receiver 46 is an assignment manager 58 utilizing conventional signal processing techniques for processing the received assignment messages. Preferably, the assignment manager 58 is similar to the MC658328 micro-controller manufactured by Motorola, Inc. of Schaumburg, Ill. It will be appreciated that other similar processors can be utilized for the assignment manager 58, and that additional processors of the same or alternative type can be added as required to handle the processing requirements of the assignment manager 58.

The assignment manager 58 is coupled to a memory 54 preferably including a random access memory (RAM), a read-only memory (ROM), and an electrically erasable programmable read-only memory (EEPROM). The assignment manager 58 decodes the address 48 in the received assignment message 32, compares the decoded address with a device address 55 stored in a memory 54, and when a match is detected, proceeds to process the location parameter 50 of the assignment message 32. The processing of the location parameter 50 by the assignment manager 58 comprises determining whether to delete the assignment message 32 or process the assignment message 32.

Coupled to the assignment manager 58 is a processor 60. Preferably, the processor 60 is similar to the MC68328 micro-controller manufactured by Motorola, Inc. of Schaumburg, Ill. It will be appreciated that other similar processors can be utilized for the processor 60, and that additional processors of the same or alternative type can be added as required to handle the processing requirements of the processor 60.

Once the assignment manager 58 determines that the assignment message 32 should be processed, it sends the assignment message 32 to the processor 60. Upon receipt of the assignment message 32, the processor 60 stores the assignment message 32 in the memory 54. The processor 60 also sends a command to an alerting device 64 to notify the driver of the vehicle 14 in which the wireless communication device 36 is located that the assignment message 32 has been received. In one embodiment, the alerting device 64 comprises a speaker and associated speaker drive circuitry capable of playing both melodies and voice recordings. Upon receiving a command from the processor 60 to play a message receipt alert, the alerting device 64 plays an audible alert. The driver then chooses to review the data 52 of the assignment message 32 on a display screen in the case of data messages or play the recorded voice message in the case of voice messages.

The alerting device 64, in another embodiment, includes a display to generate a visual notification of the assignment message receipt. When the display receives the command from the processor 60 that the assignment message 32 has been received and stored in memory 54, a message indication is displayed. The message indication, for example may be the activation of one of a plurality of message icons. Selection by the driver of the message indicator associated with the assignment message 32 will display the data 52 of the assignment message 32 on the screen in the case of data messages and play the recorded voice message in the case of voice messages. Alternatively, the data 52 of the assignment message 32 is displayed on the display screen in response to a command from the processor 60 with no required input from the driver. The display may be, for example, a full or partial starburst liquid crystal display. It will be appreciated that other similar displays can be utilized for the display.

Preferably, the assignment manager 58 is programmed to include a criteria parameter 62 for comparison of the location parameter 50 of the assignment message 32 with a current location 56 stored in the memory 54. When the location parameter 50 corresponds to the current location 56, the assignment manager 58 passes the assignment message 32 to the processor 60 for message processing.

The criteria parameter 62 is a pre-set metric for filtering the assignment message 32 received by the wireless communication device 36 to be seen only by the vehicles 14 within the fleet 12 that meet the specified criteria. The criteria parameter 62 may be a calculation, an equation, a function, or a comparison value. The criteria parameter 62 may be changed in response to receipt of a programming message, in response to a timer timeout, or in response to a direct reprogramming of the assignment manager 58.

Utilization of a criteria parameter within an assignment manager included within a wireless communication device greatly reduces the burden of the vehicle driver by filtering out assignments automatically that are outside his/her current range of assignment acceptance. The criteria parameter is programmable and therefor may be changed by the driver or by the fleet manager as required. Further, by placing the decision within the vehicle, the dispatch center is alleviated of the task of tracking each vehicle in the fleet, greatly simplifying the operation of the dispatch center and at the same time reducing traffic congestion on the communication channels.

Figure 4:
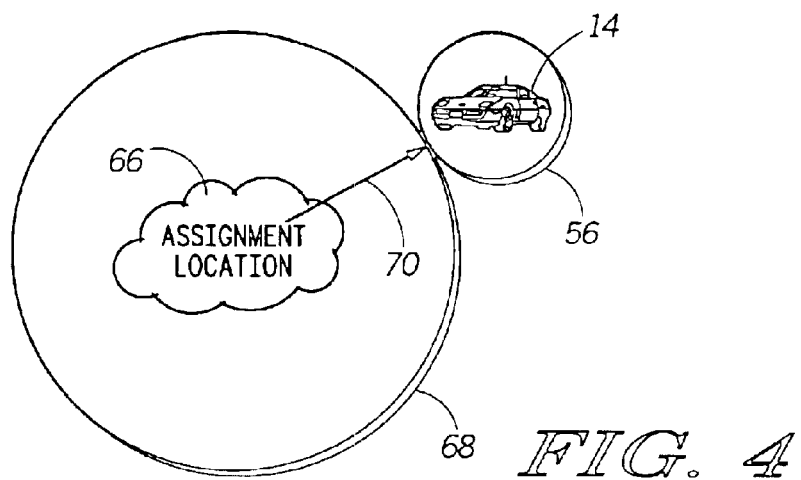
FIGS. 4, 5, and 6 illustrate various decision-making criteria for use within the wireless communication device of FIG. 2.
Figure 5:
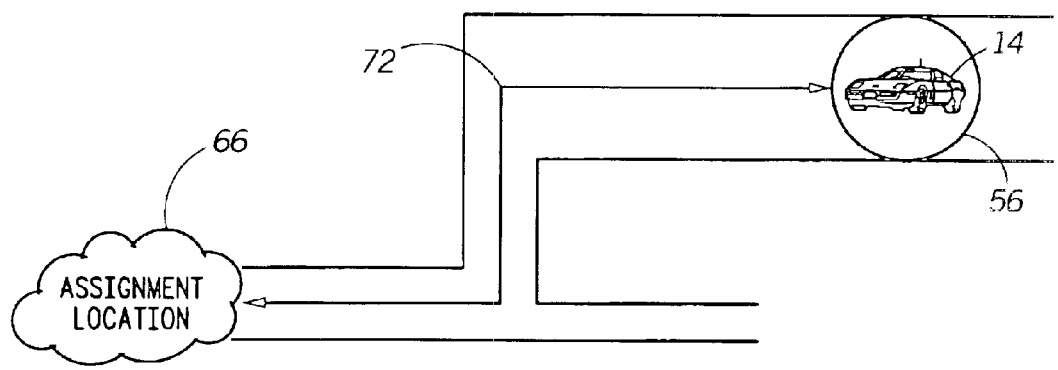
Figure 6:
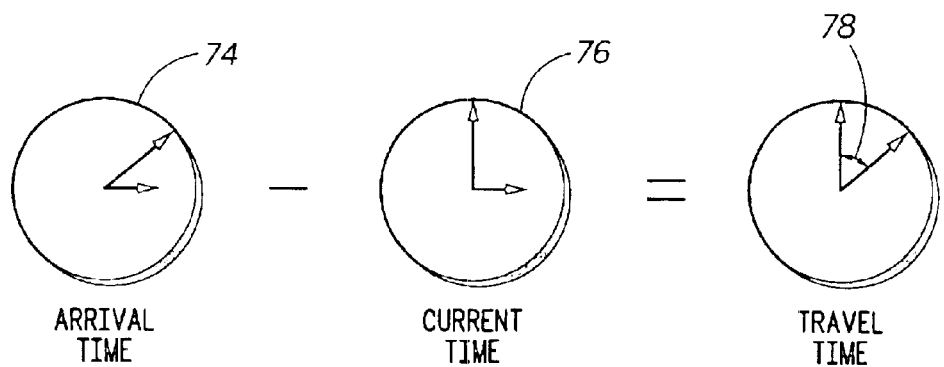

FIGS. 4, 5, and 6 illustrate various metrics for the criteria parameter 62. It will be appreciated by those skilled in the art that other metrics may also be used for the criteria parameter 62. In FIG. 4, the criteria parameter 62 is a perimeter 68 surrounding the assignment location 66 established at a radius 70 from the assignment location 66. When the wireless communication device 36 receives the assignment message 32 including the location parameter 50, the assignment manager 58 compares the location parameter 50 corresponding with the assignment location 66 to the current location 56 of the vehicle 14 in which the wireless communication device 36 resides. When the current location 56 is within the perimeter 68, the assignment message 32 will be sent to the processor 60 for further processing. When the current location 56 is not within the perimeter 68, the assignment message 32 will be deleted, and the driver of the vehicle 14 would never even be aware that it was received, thereby reducing unnecessary message receipt by the driver of the vehicle.

In FIG. 5, the criteria parameter 62 is a driving distance 72 away from the assignment location 66. Upon receipt of the assignment message 32, the assignment manager 58 calculates the driving distance from the current location 56 of the vehicle 14 in which the wireless communication device 36 resides to the assignment location 66 that corresponds to the location parameter 50. When the calculated driving distance is within the driving distance 72 set for the criteria parameter 62 the assignment message 32 will be sent to the processor 60 for further processing. When the calculated driving distance is not within the driving distance 72 set for the criteria parameter 62, the assignment message 32 will be deleted and the driver of the vehicle 14 would never even be aware that it was received. This process thereby limits the receipt of assignment messages by the vehicle driver to those within a reasonable driving distance.

Preferably, the assignment manager 58 includes a navigation program for the area in which the fleet 12 operates. The assignment manager 58 uses the navigation program to calculate the driving distance from the current location 56 to the assignment location 66.

The filtering by driving distance and by perimeter from the assignment location eliminates problems of drivers affirmatively replying to assignment messages clearly outside their range for the purpose of maximizing their own income, thereby enhancing system performance and customer satisfaction.

In FIG. 6, the criteria parameter 62 is the travel time 78 equal to the difference between an estimated arrival time 74 and a current time 76. Upon receipt of the assignment message 32, the assignment manager 58 determines the estimated arrival time 74 to the assignment location 66. The current time 76 is subtracted from the estimated arrival time 74 to calculate a travel time. When the calculated travel time is within the travel time 78 assigned to the criteria parameter 62, the assignment message 32 will be sent to the processor 60 for further processing. When the calculated travel time is not within the travel time 78 assigned to the criteria parameter 62, the assignment message 32 will be deleted and the driver of the vehicle 14 would never even be aware that it was received. This process thereby limits receipt of assignment messages by vehicle drivers to those that the driver could arrive at within a reasonable timeframe.

Preferably, the assignment manager 58 includes a smart program for tracking of traffic conditions coupled to the assignment manager 58. The smart program calculates the travel time required based on the latest received traffic conditions. Alternatively, the assignment manager 58 may include a program incorporating average travel times and uses the average travel times to calculate the travel time from the current location 56 to the assignment location 66.

The criteria parameter 62 alternatively further includes hours of operation for the vehicle 14. The hours of operation in one embodiment are set by the driver of the vehicle at the beginning of each shift. Alternatively, the hours of operation are set either manually or automatically via the receipt of a message from the dispatch center. When the estimated arrival time does not fall between the hours of operation, the assignment message 32 will be deleted and the driver of the vehicle 14 would never even be aware that it was received.

In another embodiment, the criteria parameter 62 is a type of vehicle that the driver of the vehicle 14 is using at that time. For example, passenger transportation fleets typically include limousines, cars, small cars, vans, and buses. When the location parameter 50 of the assignment message 32 is the number of passengers to be picked up and the criteria parameter 62 is the type of vehicle, the assignment message 32 is deleted if the number of passengers do not fit within that type of vehicle.

The examples above illustrate the variety of criteria parameter 62 programmed based on the type of fleet, type of business, and needs of the dispatch center. It will be appreciated by those skilled in the art that other metrics may also be used for the criteria parameter 62.

Figure 7:
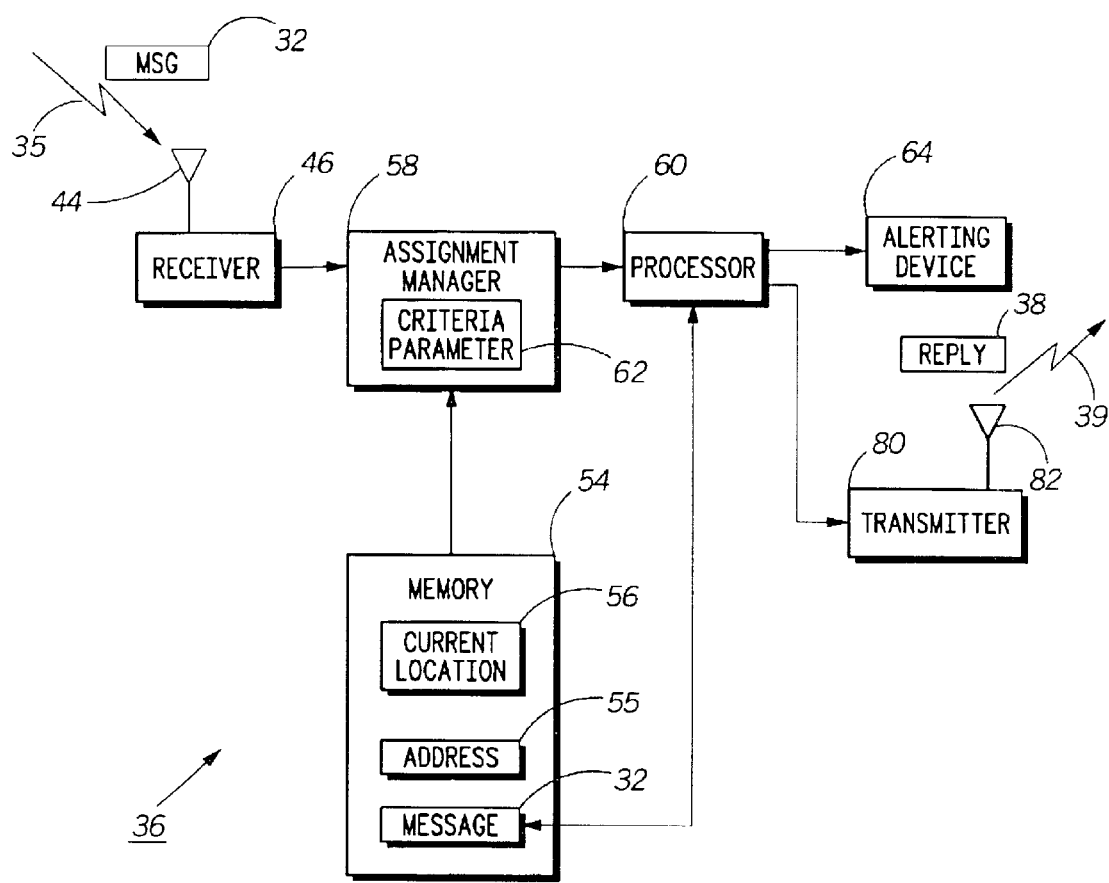
FIGS. 7, 8, and 9 are electrical block diagrams of alternate embodiments of the wireless communication device of FIG. 2.

FIG. 7 is an alternate embodiment of the wireless communication device 36. The reference numbers of the embodiment of FIG. 2 have been retained for those elements that are common. The wireless communication device 36 of FIG. 7 includes all the elements and functionality illustrated in FIG. 2 and further comprises a transmitter 80 and a device transmit antenna 82.

The transmitter 80 is coupled to the processor 60 and is responsive to commands from the processor 60. When the transmitter 80 receives a command from the processor 60, the transmitter 80 sends the reply 38 via the device transmit antenna 82 to the dispatch center 16. The reply 38 in one embodiment is transmitted over the first communication channel 35, the same channel used to communicate the assignment message 32. Using the same communication channel for both sets of communications eliminates the need for multiple channels and is desirable in regions where there is a shortage of available channels. In another embodiment, the reply 38 is transmitted over the second communication channel 39. Using a different channel for the reply reduces the traffic on the first communication channel and is desirable in regions where the communication channels are congested.

The reply 38 preferably includes an affirmative indication to the dispatch center that the vehicle 14 containing the wireless communication device 36 will fulfill the assignment contained within the data 52 of the assignment message 32. The reply 38 preferably also includes a vehicle identification and the vehicle's current location 56 and estimated travel time 78 to the assignment location 66. It will be appreciated that additional information may be included in the reply 38.

Figure 8:
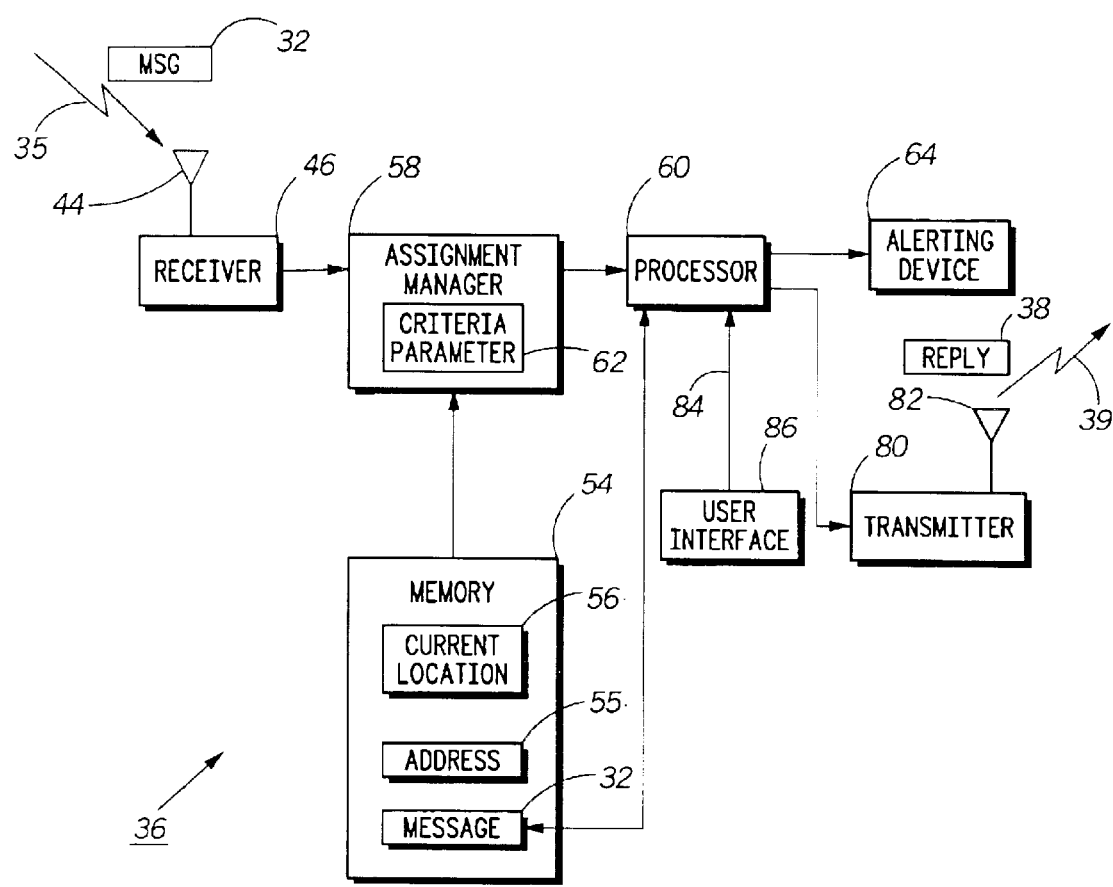

FIG. 8 is an alternate embodiment of the wireless communication device 36. The reference numbers of the embodiments of FIGS. 2 and 7 have been retained for those elements that are common. The wireless communication device 36 includes all the elements and functionality illustrated in FIG. 7 and further comprises a user interface 86.

In the embodiment of FIG. 8, after the processor 60 sends a command to the alerting device 64, it waits for a user input 84 from the user interface 86. The processor 60 commands the transmitter 80 to transmit a reply 38 via the device transmit antenna 82 in response to receipt of the user input 84 from the user interface 86. The user interface 86 may be a button press, a series of button presses, a voice response by the driver of the vehicle 14, or some other similar method of manual response initiated by the driver of the vehicle to the wireless communication device 36.

Use of the user interface 86 leaves the control of acceptance or rejection of an assignment message with the driver of the vehicle while still filtering assignment messages obviously outside of his/her area. This two step filtering process: the first being automatic by the assignment manager and the second being manual via the user interface, gives the driver of the vehicle control of the matching of assignments, an improvement over the dispatch center-based systems which eliminate all driver control of assignment matches.

Figure 9:
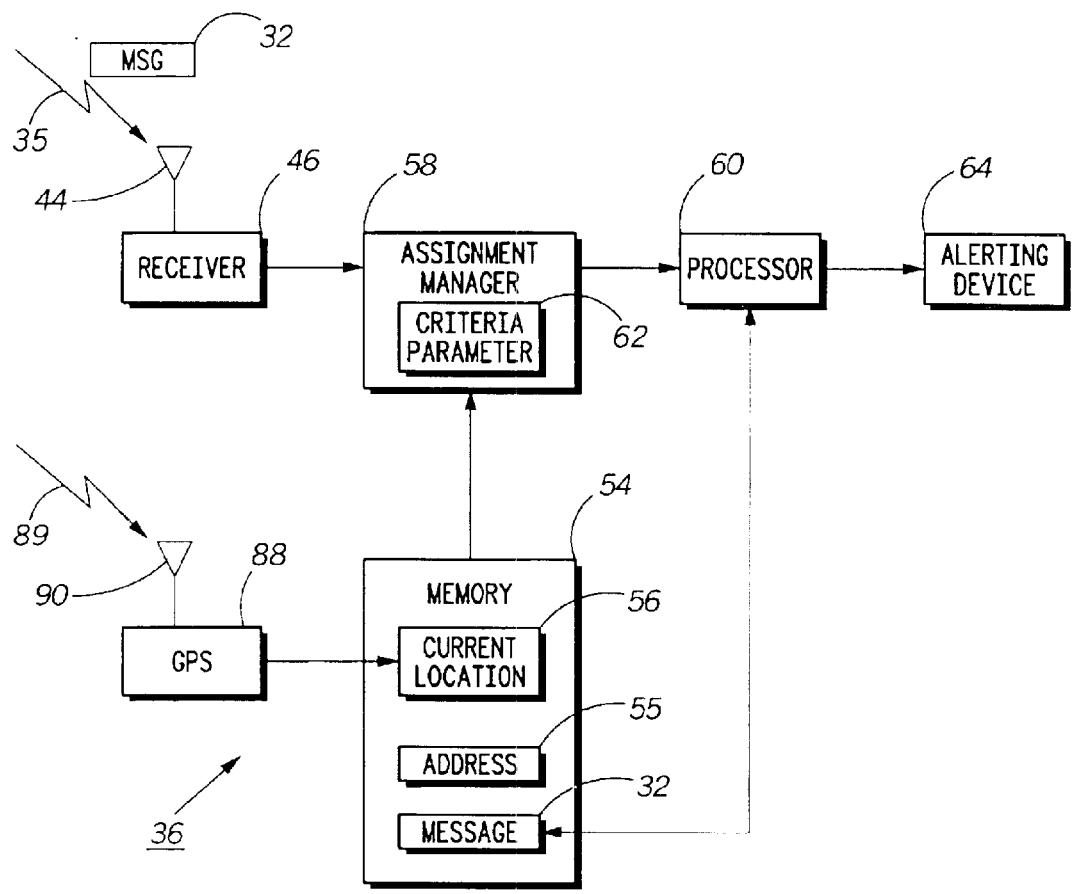

FIG. 9 is an alternate embodiment of the wireless communication device 36. The reference numbers of the embodiment of FIG. 2 have been retained for those elements that are common. The wireless communication device 36 includes all the elements and functionality illustrated in FIG. 2 and further comprises a global positioning satellite (GPS) receiver 88 and GPS antenna 90.

The Global Positioning System (GPS) is a worldwide radio-navigation system formed from a constellation of 24 satellites and their ground stations. GPS uses these "manmade stars" as reference points to calculate positions accurate to a matter of meters. The GPS receiver 88 uses the satellites in space as reference points for locations here on earth. The GPS receiver 88 measures distance using the travel time of radio signals. The GPS receiver 88 has very accurate timing to measure travel time. Along with distance, the GPS receiver 88 knows exactly where the satellites are in space. Finally the GPS receiver 88 corrects for any delays the signal experiences as it travels through the atmosphere.

The GPS receiver 88 receives a plurality of signals 89 via the GPS antenna 90 corresponding to the current location 56. The GPS receiver 88 is coupled to the memory 54 and stores the current location 56, determined from the processing of the plurality of signals 89, in the memory 54 for later use by the assignment manager 58 as described previously with regards to FIG. 2. The GPS receiver 88 provides an accurate method for the wireless communication device 36 to determine the vehicle's current location.

Figure 10:
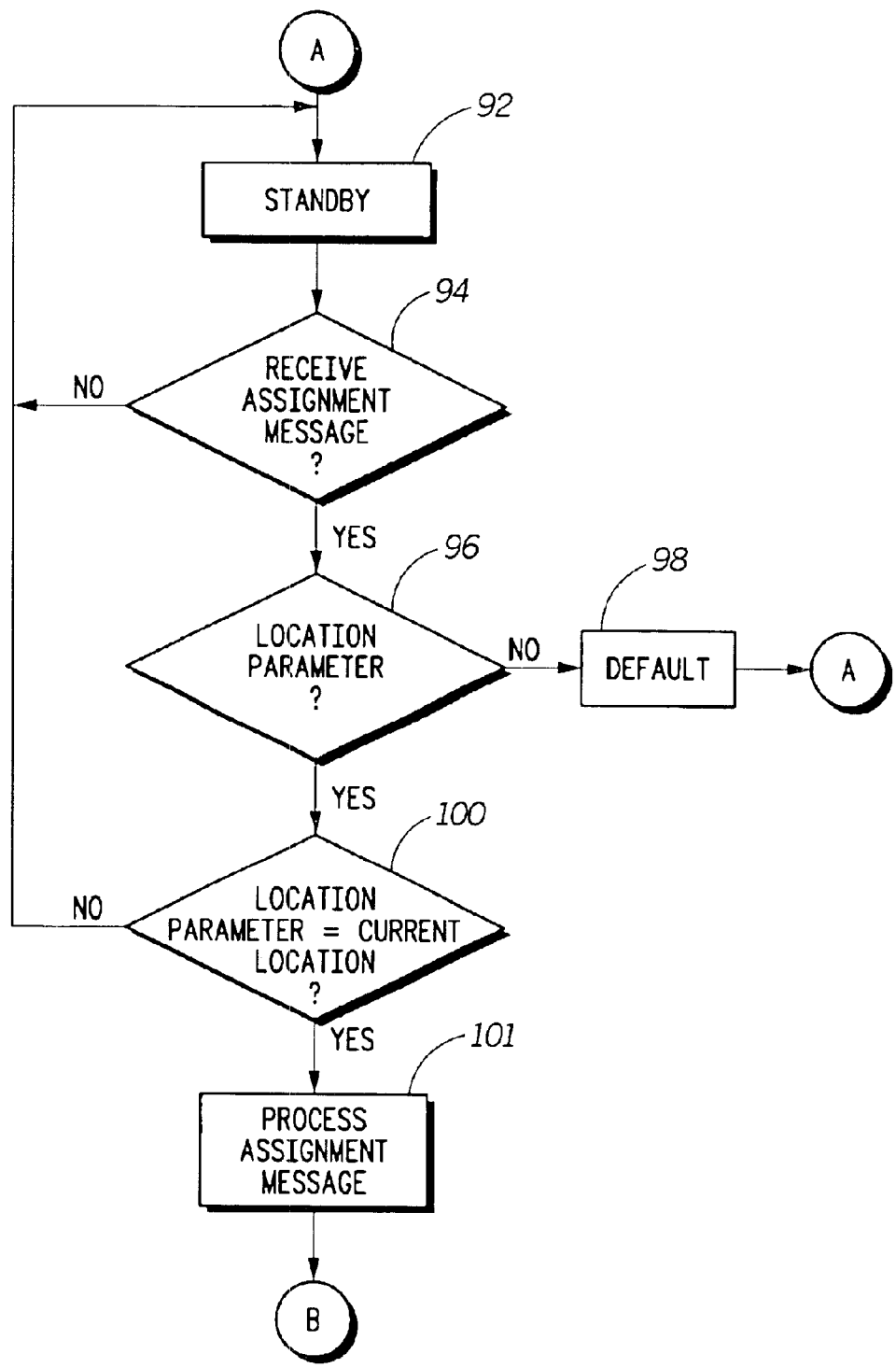
FIGS. 10 and 11 are flowcharts illustrating the operation of the wireless communication device of FIG. 2 in accordance with the present invention.

FIG. 10 is a flowchart illustrating the operation of the wireless communication device 36 in accordance with the present invention. As indicated in step 92 of FIG. 10, the wireless communication device 36 is normally in the standby mode for optimal power savings. In Step 94, the wireless communication device 36 periodically checks for receipt of the assignment message 32. When no assignment message 32 is received, the wireless communication device 36 returns to the standby mode of Step 92. In Step 96, when the assignment message 32 is received, the wireless communication device 36 checks for the presence of the location parameter 50 in the assignment message 32. In Step 98, when no location parameter 50 is included in the assignment message 32, the wireless communication device 36 implements whatever default instructions have been programmed into the assignment manager 58 and the processor 60. The default instruction, for example, may be the processing of the assignment message, the deletion of the assignment message, or the sending of a query for more information from the dispatch center. In Step 100, when the location parameter 50 is included in the assignment message 32, the assignment manager 58 compares the location parameter 50 to the current location 56 stored in the memory 54. When the location parameter 50 does not correspond to the current location 56, the wireless communication device 36 goes back to Step 92, the standby state operation. In Step 101, when the location parameter 50 corresponds to the current location 56, the processor 60 processes the assignment message 32. The process then continues to node B as described in FIG. 12.

Processing the assignment message 32 only upon a defined correspondence between the location parameter 50 and the current location 56 greatly reduces the assignment messages being received and processed by each individual driver. This automatic filter ensures the driver only is alerted to assignments in which there is a probability that he/she would be within the scope of the area of the assignment location.

Figure 11:
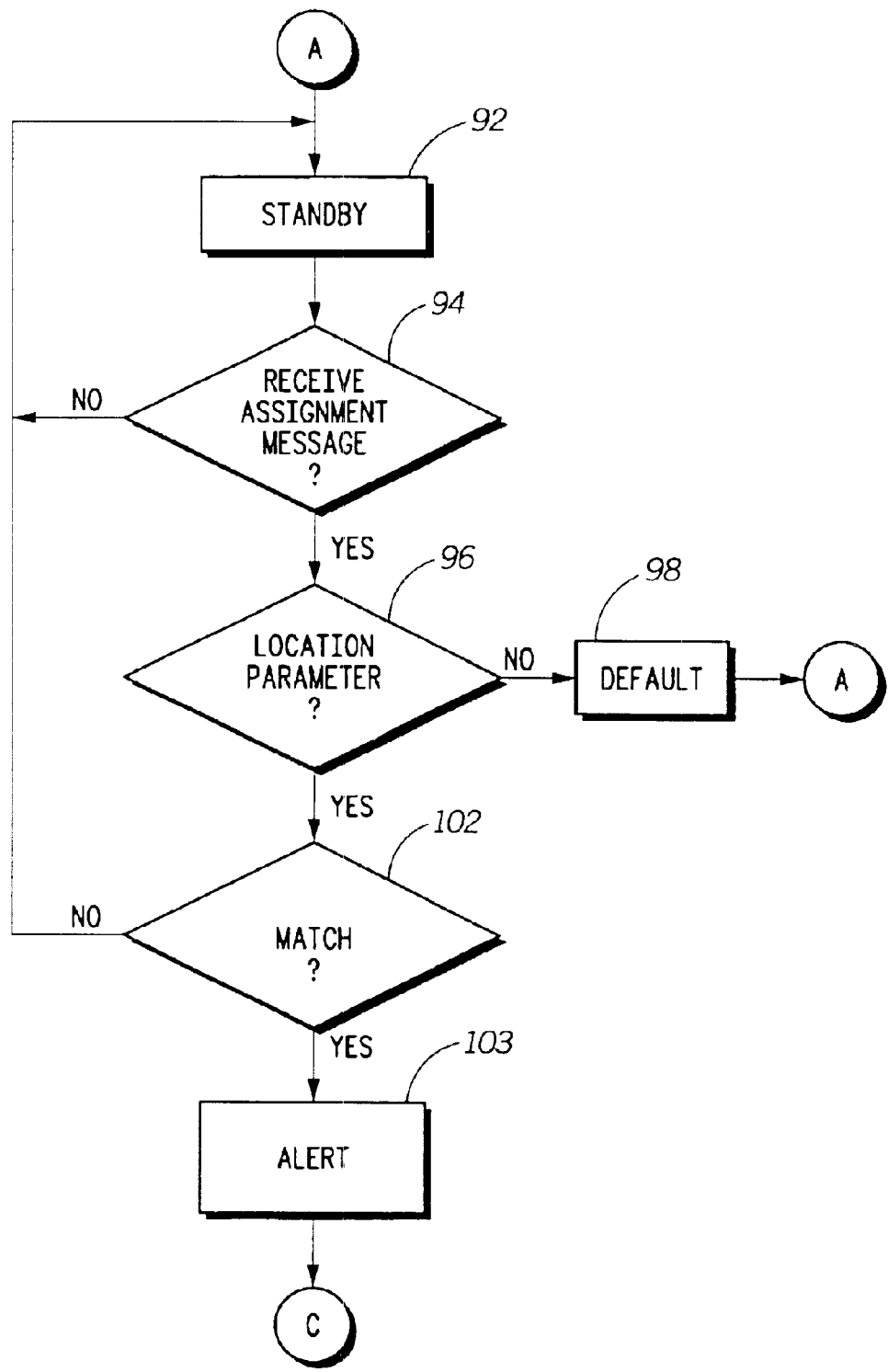

FIG. 11 is a flowchart illustrating an alternate operation of the wireless communication device of FIG. 2 in accordance with the present invention. As indicated in step 92 of FIG. 10, the wireless communication device 36 is normally in the standby mode for optimal power savings. In Step 94, the wireless communication device 36 periodically checks for receipt of the assignment message 32. When no assignment message 32 is received, the wireless communication device 36 returns to Step 92 in standby mode. When the assignment message 32 is received, the wireless communication device 36 proceeds to Step 96 and checks for the presence of the location parameter 50 in the assignment message 32. In Step 98, when no location parameter 50 is included in the assignment message 32, the wireless communication device 36 implements whatever default instructions have been programmed into the assignment manager 58 and the processor 60. In Step 102, when the location parameter 50 is included in the assignment message 32, the assignment manager 58 compares the location parameter 50 to the current location 56 stored in the memory 54 using the criteria parameter 62 contained within the assignment manager 58. When the location parameter 50 does not meet the criteria parameter 62 in relation to the current location 56, the wireless communication device 36 goes back to Step 92, the standby state operation. In Step 103, when the location parameter 50 does meet the criteria parameter 62 in relation to the current location 56, the alerting device 64 is activated. The process then continues to node C as described in FIG. 12.

Figure 12:
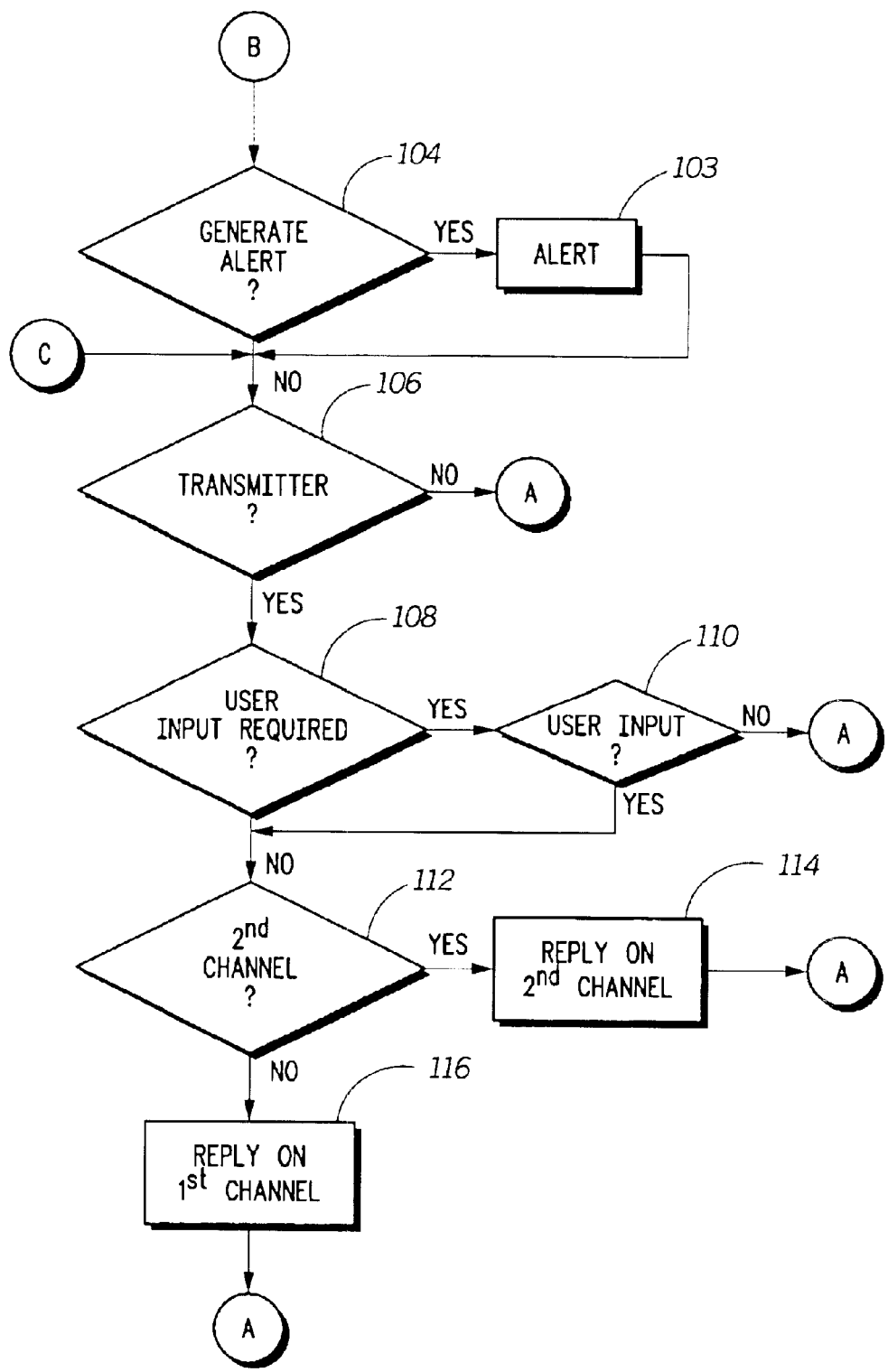
FIG. 12 is a flowchart illustrating more detail of the operation of FIGS. 10 and 11.

FIG. 12 is a flowchart illustrating more detail of the operation of FIGS. 10 and 11. Moving from node B to Step 104, the system checks if the processor 60 is programmed to generate an alert. In Step 103, when the processor 60 is programmed to generate an alert, the processor 60 sends a command to the alerting device 64 to do so. In Step 106, when no alert is required or after the alert is generated, the process checks for the presence of the transmitter 80. When no transmitter 80 is present, the wireless communication device 36 returns to node A and the standby state of Step 92. In Step 108, when a transmitter 80 is present, the process checks if the processor 60 is programmed to require the user input 84 from the user interface 86 prior to sending a command to the transmitter 80. When the user input 84 is required, in Step 110, the processor 60 looks for the user input 84. When no user input 84 is detected, the wireless communication device 36 returns to node A and the standby state of Step 92. When the user input 84 is detected in Step 110, the processor 60 generates the command to the transmitter 80 to reply to the original assignment message 32. In Step 112, the processor 60 checks for the presence of the second communication channel 39. In Step 114, When the second communication channel 39 is present, the reply 38 is sent by the transmitter 80 over the second communication channel 39. The wireless communication device 36 then returns to node A and the standby state of Step 92. In Step 116, when the second communication channel 39 is not present, the transmitter 80 sends the reply 38 over the first communication channel 35 in which the assignment message 32 was also communicated. The wireless communication device 36 then returns to node A and the standby state of Step 92.

Figure 13:
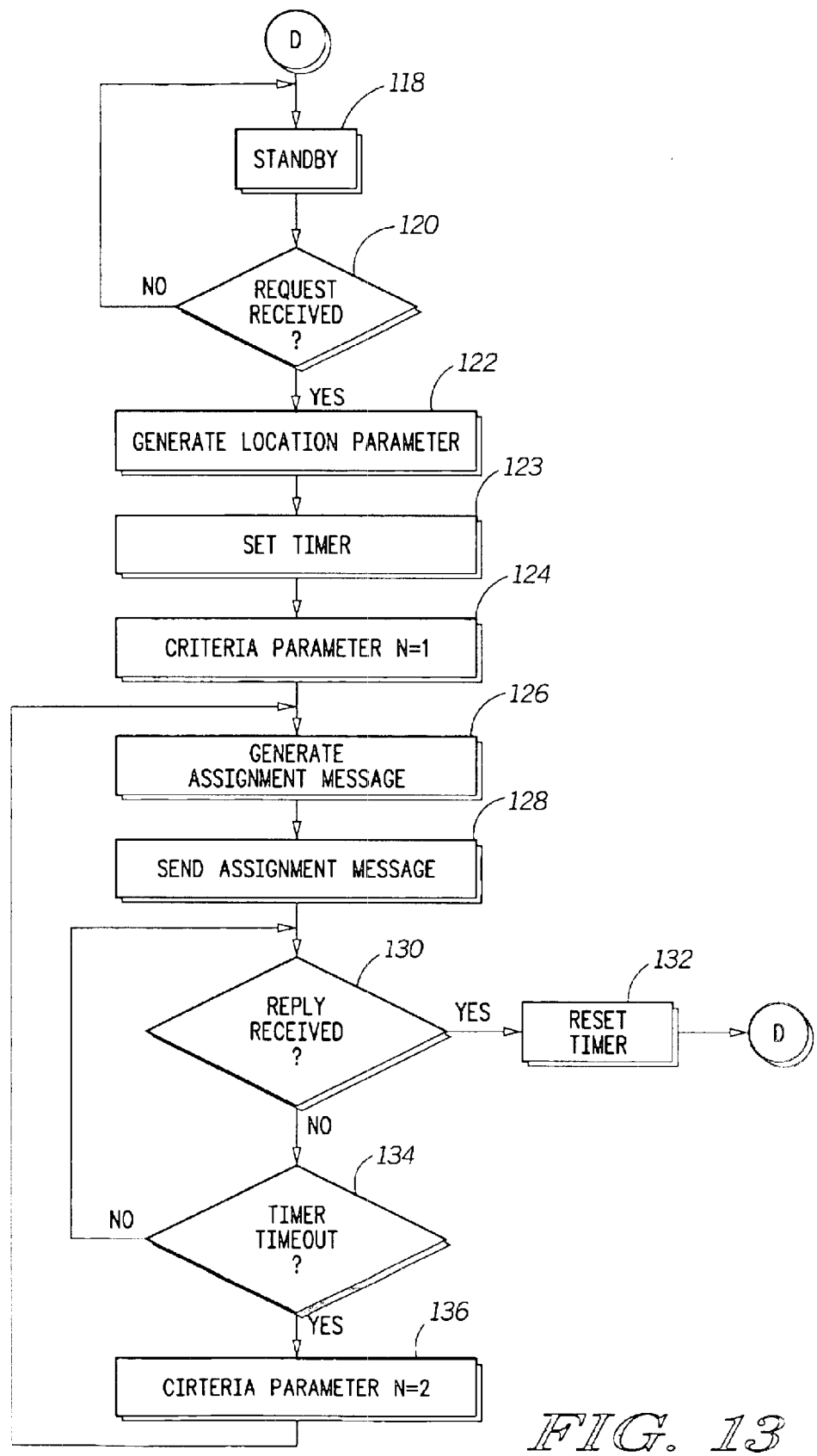
FIG. 13 is a flowchart of the operation of a dispatch center for use within the vehicle dispatch system of FIG. 1.

FIG. 13 is a flowchart of the operation of the dispatch center 16 for use within the vehicle dispatch system 10 of FIG. 1. In Step 118, the dispatch center 16 is in a standby state. In the standby state, the dispatch center 16 reduces its operation to draw less current and require less power to operate. In Step 120, the dispatch center 16 periodically checks for receipt of the request for dispatch 28. When no request for dispatch 28 is received, the dispatch center 16 returns to the standby state of Step 118. In Step 122, when a request for dispatch 28 is received by the dispatch center 16, the dispatch controller 18 of the dispatch center 16 generates the location parameter 50 identifying the assignment location 66 of the request for dispatch 28. In Step 123, the dispatch controller 18 sets the timer 19 for tracking the time for processing of the request for dispatch 28 to matching of the assignment with the vehicle 14. In Step 124, the dispatch controller 18 sets a criteria parameter counter to N=1. In Step 126, the dispatch controller 18 generates the assignment message 32.

Figure 14:
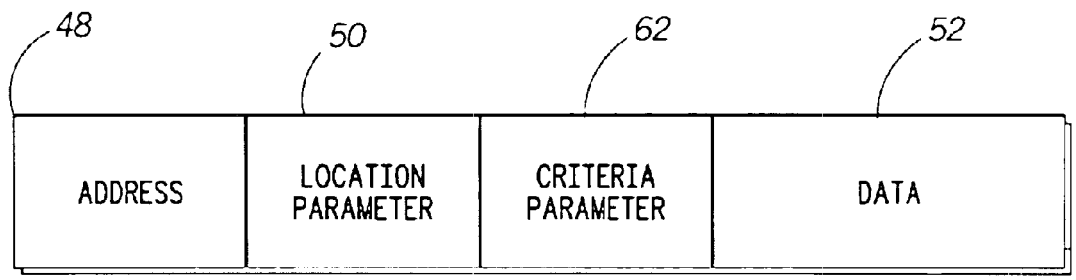
FIG. 14 is an alternate embodiment of the assignment message of FIG. 3.

FIG. 14 illustrates one embodiment of the assignment message 32. The assignment message 32 preferably includes the address 48, the location parameter 50, a criteria parameter 62 and the data 52. The address 48 identifies the wireless communication device 36 for which the assignment message 32 is directed. The location parameter 50 identifies the geographical location of the assignment being transmitted in the data 52 of the assignment message 32. The data 52 includes all details of the assignment such as customer name, number of passengers, the required time of pick-up, etc.

The criteria parameter 62, as described previously, is a pre-set measurement for filtering the assignment message 32 received by the wireless communication device 36 to be seen only by the vehicles 14 within the fleet 12 that meet the specified criteria. The criteria parameter 62 may be a calculation, an equation, a function, or a comparison value. The dispatch controller 18 generates the criteria parameter 62 to be sent in the assignment message 32. FIGS. 4, 5, and 6, previously described, illustrate various metrics for the criteria parameter 62. It will be appreciated by those skilled in the art that other metrics may also be used for the criteria parameter 62.

Referring back to FIG. 13, in Step 128 the dispatch controller 18 sends a command to the dispatch transmitter 20 to transmit the assignment message 32 via the transmit antenna 34 to each vehicle 14 of the fleet 12 on the first communication channel 35. The assignment message 32 is then sent to the vehicles 14 of the fleet 12 which each receive the assignment message 32 using the wireless communication device 36. In Step 130, the dispatch center 16 checks for receipt of the reply 38 by at least one vehicle 14. The reply 38 is received by the dispatch center 16 via the receive antenna 40 to the dispatch receiver 22. The dispatch receiver 22 informs the dispatch controller 18 of receipt of the reply 38. In Step 132, when the reply 38 has been received, the dispatch controller 18 resets the timer 19. The dispatch controller 18 then completes the processing of the assignment match and then returns to Node D and the dispatch center 16 returns to the standby state of Step 118. In Step 134, when no reply 38 is received by the dispatch center 16, the dispatch controller 18 checks for timeout of the timer 19. When the timer has not timed out, the dispatch controller 18 continues back to Step 130 periodically checking for receipt of the reply 38. In Step 136, when the timer 19 has timed out, the dispatch controller 18 sets the criteria parameter 62 to N=2 which typically will relax the criteria to be used for matching the vehicle 14 with the request for dispatch 28. The dispatch controller 18 then cycles back to Step 126 and generates the new assignment message 32.

Figure 15:
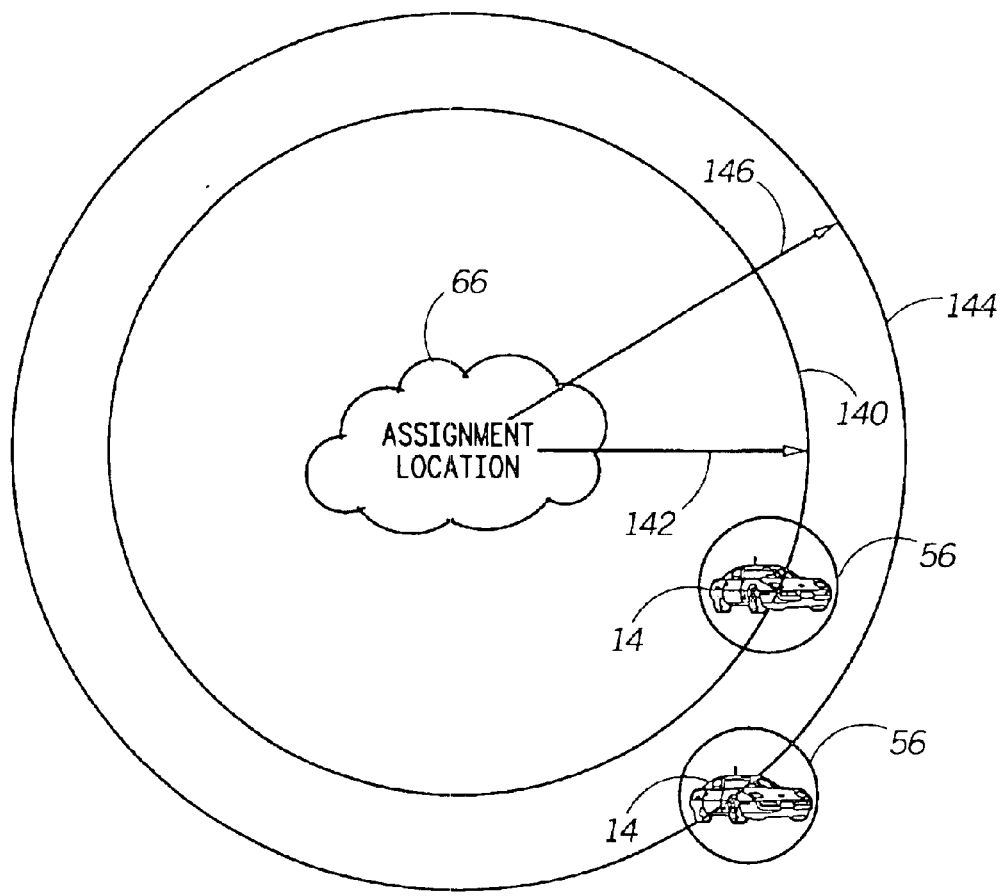
FIGS. 15, 16, and 17 illustrate various decision making criteria for use within the vehicle dispatch system of FIG. 1.
Figure 16:
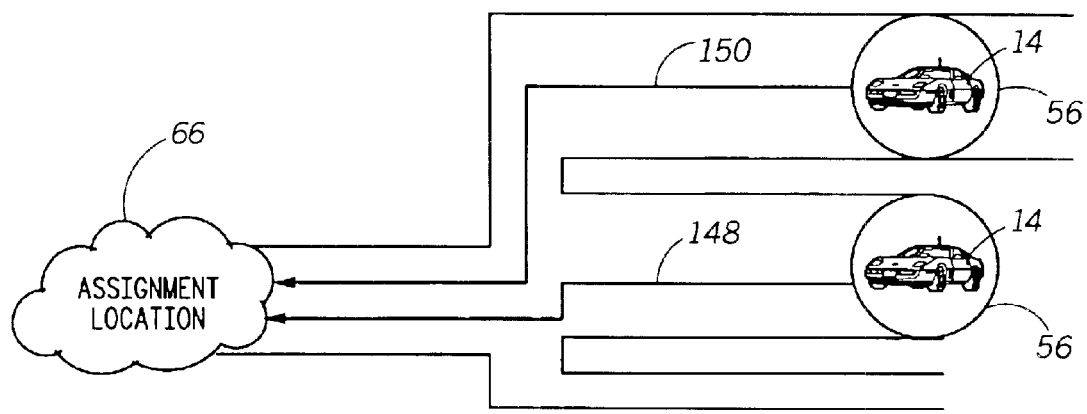
Figure 17:
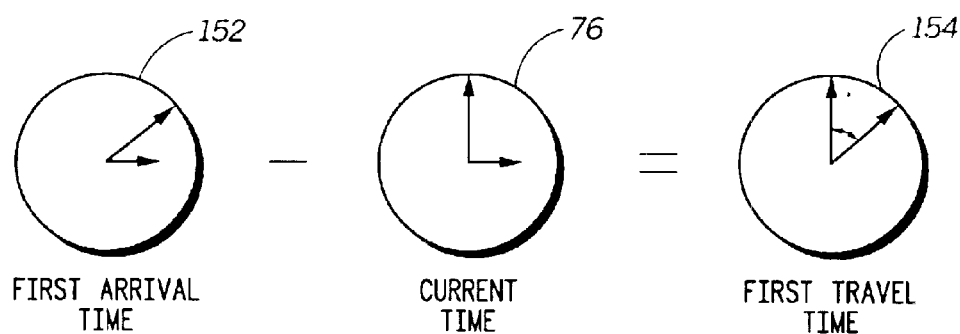
Figure 17:
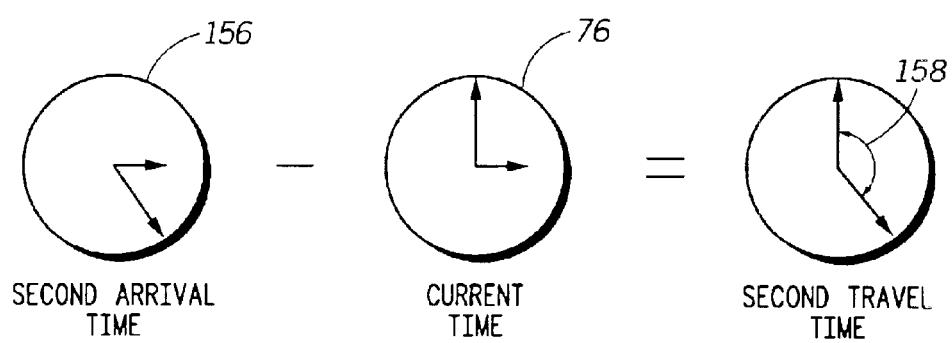

FIGS. 15, 16, and 17 illustrate various calculations of the N=1 and N=2 criteria parameters. In FIG. 15, the criteria parameter 62 is first set at N=1 to a first perimeter 140 surrounding the assignment location 66 at a first radius 142 from the assignment location 66. The first radius 142 in one embodiment is chosen based on the time of day. For example, during peak hours the first radius 142 is set to a smaller dimension than during non-peak hours. When the wireless communication device 36 receives the assignment message 32 including the location parameter 50 and the criteria parameter 62, it compares the location parameter 50 corresponding with the assignment location 66 to the current location 56 of the vehicle 14 in which the wireless communication device 36 resides. When the current location 56 is within the first perimeter 140, the assignment message 32 will be processed. When the current location 56 is not within the first perimeter 140, the assignment message 32 will be deleted and the driver of the vehicle 14 would never even be aware that it was received. When no reply 38 is received by the dispatch controller 18, the criteria parameter 62 is set to N=2 corresponding to a second perimeter 144 surrounding the assignment location 66 at a second radius 146 from the assignment location 66. The second radius 146 is preferably larger than the first radius 142. When the wireless communication device 36 receives the assignment message 32 including the location parameter 50 and the criteria parameter 62, it compares the location parameter 50 corresponding with the assignment location 66 to the current location 56 of the vehicle 14 in which the wireless communication device 36 resides. When the current location 56 is within the second perimeter 144, the assignment message 32 will be processed. When the current location 56 is not within the second perimeter 144, the assignment message 32 will be deleted and the driver of the vehicle 14 would never even be aware that it was received. When no reply 38 is received by the dispatch controller 18 indicating that no vehicle 14 is located within the second perimeter 144, the dispatch controller 18 will generate a next criteria parameter (N=3) and continue the process previously described until the reply 38 is received.

In FIG. 16, the criteria parameter 62 is first set at N=1 to a first driving distance 148 away from the assignment location 66. Upon receipt of the assignment message 32, the wireless communication device 36 calculates the driving distance from the current location 56 of the vehicle 14 in which the wireless communication device 36 resides to the assignment location 66 that corresponds to the location parameter 50. When the calculated driving distance is within the first driving distance 148 set for the criteria parameter 62 the assignment message 32 will be processed. When the calculated driving distance is not within the first driving distance 148 set for the criteria parameter 62, the assignment message 32 will be deleted and the driver of the vehicle 14 would never even be aware that it was received. When the dispatch controller 18 does not receive the reply 38, the criteria parameter 62 is set to N=2 corresponding to a second driving distance 150 away from the assignment location 66. The second driving distance 150 is preferably larger than the first driving distance 148. Upon receipt of the assignment message 32, the wireless communication device 36 calculates the driving distance from the current location 56 of the vehicle 14 in which the wireless communication device 36 resides to the assignment location 66 that corresponds to the location parameter 50. When the calculated driving distance is within the second driving distance 150 set for the criteria parameter 62 the assignment message 32 will be processed. When the calculated driving distance is not within the second driving distance 150 set for the criteria parameter 62, the assignment message 32 will be deleted and the driver of the vehicle 14 would never even be aware that it was received. When no reply 38 is received by the dispatch controller 18 indicating that no vehicle 14 is located within the second driving distance 150, the dispatch controller 18 will generate a next criteria parameter (N=3) and continue the process previously described until the reply 38 is received.

Preferably, the wireless communication device 36 includes a navigation program for the area in which the fleet 12 operates. The wireless communication device 36 uses the navigation program to calculate the driving distance from the current location 56 to the assignment location 66.

In FIG. 17, the criteria parameter 62 is first set at N=1 to a first travel time 154 equal to the difference between a first arrival time 152 and the current time 76. Upon receipt of the assignment message 32, the wireless communication device 36 calculates its estimated arrival time to the assignment location 66. The current time 76 is subtracted from the estimated arrival time to calculate a travel time. When the calculated travel time of the vehicle 14 is within the first travel time 154 assigned to the criteria parameter 62, the assignment message 32 will be processed. When the calculated travel time is not within the first travel time 154 assigned to the criteria parameter 62, the assignment message 32 will be deleted and the driver of the vehicle 14 would never even be aware that it was received. When the dispatch controller 18 does not receive the reply 38, the criteria parameter 62 is set to N=2 corresponding to a second travel time 158 to the assignment location 66 equal to the difference between a second arrival time 156 and the current time 76. The second travel time 158 is preferably larger than the first travel time 154. Upon receipt of the assignment message 32, the wireless communication device 36 calculates its estimated arrival time to the assignment location 66. The current time 76 is subtracted from the estimated arrival time to calculate a travel time. When the calculated travel time of the vehicle 14 is within the second travel time 158 assigned to the criteria parameter 62, the assignment message 32 will be processed. When the calculated travel time is not within the second travel time 158 assigned to the criteria parameter 62, the assignment message 32 will be deleted and the driver of the vehicle 14 would never even be aware that it was received. When no reply 38 is received by the dispatch controller 18 indicating that no vehicle 14 is located within the second driving distance 150, the dispatch controller 18 will generate a next criteria parameter (N=3) and continue the process previously described until the reply 38 is received.

Preferably, the wireless communication device 36 includes a smart program for tracking of traffic conditions. The smart program calculates the travel time required based on the latest received traffic conditions. Alternatively, the wireless communication device 36 may include a program incorporating average travel times and uses the average travel times to calculate the travel time from the current location 56 to the assignment location 66.

The invention as described eliminates many of the drawbacks of existing vehicle dispatch systems. The invention reduces the traffic congestion on the communication channels and also reduces the frequency of messages received by the vehicle driver. The invention further reduces the potential for abuse of the system from drivers accepting assignments outside their range of travel. Overall, the system and method described reduces system costs, improves system performance, and improves customer satisfaction, the most important aspects of a vehicle dispatch system.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In a vehicle dispatch system having a dispatch center and a plurality of wireless communication devices, a method for communication between the dispatch center and the plurality of wireless communication devices comprising:

receiving a request for dispatch including an assignment location;

generating an assignment message including a location parameter, wherein the location parameter corresponds to the assignment location; and sending an assignment message including a location parameter from the dispatch center to the plurality of wireless communication devices, wherein the assignment message is a wireless message transmitted from the dispatch center to the wireless communication device over a radio frequency channel, and further wherein each wireless communication device having a current location:
receives the assignment message including the location parameter from the dispatch center,
compares the location parameter to the current location of the wireless communication device,
processes the assignment message when the location parameter corresponds to the current location of the wireless communication device, and
automatically deletes the assignment message when the location parameter does not correspond to the current location of the wireless communication device.

2. A method for communication between the dispatch center and a plurality of wireless communication devices as recited in claim 1 further comprising: generating an alert in response to the processing of the assignment message.

3. A method for communication between the dispatch center and a plurality of wireless communication devices as recited in claim 2 further comprising: transmitting a reply to the dispatch center.

4. A method for communication between the dispatch center and a plurality of wireless communication devices as recited in claim 3 wherein the reply is transmitted in response to a user input.

5. A method for communication between the dispatch center and a plurality of wireless communication devices as recited in claim 3 wherein the assignment message is received on a first communication channel and the reply is transmitted on a second communication channel.

6. In a vehicle dispatch system having a dispatch center and a plurality of wireless communication devices, a method for communication between the dispatch center and the plurality of wireless communication devices comprising:
receiving a request for dispatch including an assignment location;
generating an assignment message including an address, a location parameter, and a data, wherein the location parameter corresponds to the assignment location; and
sending an assignment message including the address, the location parameter, and the data from the dispatch center to the plurality of wireless communication devices, wherein the assignment message is a wireless message transmitted from the dispatch center to the wireless communication device over a radio frequency channel, and further wherein each wireless communication device having a current location:
receives the assignment message including the address, the location parameter, and the data from the dispatch center,
compares the address in the received assignment message to a device address stored in a memory of the wireless communication device,
compares the location parameter to a current location stored in the memory of the wireless communication device using a matching criteria for detecting an affirmative match in response to receipt of the assignment message including the location parameter and the address matching the device address location parameter to the current location of the wireless communication,
generates an alert in response to the detection of an affirmative match, and
processes the data of the assignment message in response to the detection of an affirmative match.

7. A method for communication between a dispatch center and a plurality of wireless communication devices as recited in claim 6 wherein the matching criteria is a perimeter surrounding the assignment location.

8. A method for communication between a dispatch center and a plurality of wireless communication devices as recited in claim 6 wherein the matching criteria is a driving distance from the assignment location.

9. A method for communication between a dispatch center and a plurality of wireless communication devices as recited in claim 6 wherein the matching criteria is a travel time to the assignment location.

10. A method for communication between a dispatch center and a plurality of wireless communication devices as recited in claim 6 further comprising: transmitting a reply from the wireless communication device to the dispatch center in response to processing the assignment message.

11. A method for communication between a dispatch center and a plurality of wireless communication devices as recited in claim 10 wherein the reply is transmitted in response to a user input.

12. A method for communication between a dispatch center and a plurality of wireless communication devices as recited in claim 10 wherein the assignment message is received on a first communication channel and the reply is transmitted on a second communication channel.

* * * * *